US008200204B2

(12) United States Patent
Cho

(10) Patent No.: US 8,200,204 B2
(45) Date of Patent: Jun. 12, 2012

(54) APPARATUS AND METHOD FOR DISPLAYING TRAFFIC INFORMATION USING WIDGETS IN MOBILE TERMINAL

(75) Inventor: Dae Hee Cho, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 419 days.

(21) Appl. No.: 12/507,347

(22) Filed: Jul. 22, 2009

(65) Prior Publication Data

US 2010/0022228 A1    Jan. 28, 2010

(30) Foreign Application Priority Data

Jul. 28, 2008  (KR) .................. 10-2008-0073470

(51) Int. Cl.
*H04M 3/493* (2006.01)
(52) U.S. Cl. ............... 455/414.2; 455/414.3; 455/456.3; 455/556.1; 715/748
(58) Field of Classification Search ............... 455/186.1, 455/228, 345, 45, 161.3, 158.4; 340/905; 379/224, 229, 269; 370/432
See application file for complete search history.

(56) References Cited

U.S. PATENT DOCUMENTS

| | | | | |
|---|---|---|---|---|
| 2004/0102898 | A1* | 5/2004 | Yokota et al. | 701/210 |
| 2004/0124977 | A1* | 7/2004 | Biffar | 340/539.13 |
| 2004/0198339 | A1* | 10/2004 | Martin | 455/423 |
| 2008/0228777 | A1* | 9/2008 | Sawant | 707/10 |
| 2008/0275629 | A1* | 11/2008 | Yun | 701/118 |
| 2008/0294998 | A1* | 11/2008 | Pyhalammi et al. | 715/748 |
| 2009/0037087 | A1* | 2/2009 | Qi et al. | 701/117 |
| 2009/0088978 | A1* | 4/2009 | Ishikawa et al. | 701/223 |
| 2009/0128365 | A1* | 5/2009 | Laskin | 340/937 |
| 2009/0171939 | A1* | 7/2009 | Athsani et al. | 707/5 |
| 2009/0234573 | A1* | 9/2009 | Notarantonio | 701/201 |
| 2010/0257435 | A1* | 10/2010 | Kim et al. | 714/795 |
| 2011/0099487 | A1* | 4/2011 | Pyhalammi et al. | 715/762 |

FOREIGN PATENT DOCUMENTS

KR    10-2008-0023891 A    3/2008

* cited by examiner

*Primary Examiner* — Nick Corsaro
*Assistant Examiner* — Mahendra Patel
(74) *Attorney, Agent, or Firm* — Jefferson IP Law, LLP

(57) ABSTRACT

An apparatus and method of displaying traffic information using at least one widget in a mobile terminal are provided. The method of displaying traffic information in a mobile terminal includes receiving traffic information from at least one broadcasting station through at least one digital broadcasting channel, and displaying the traffic information on a standby screen with at least one of an image file and a text file using the at least one widget. Thereby, a user can determine a traffic situation using the traffic information provided on the standby screen using the at least one widget. Further, even when no navigation device is provided in the mobile terminal, the user can conveniently receive traffic information.

15 Claims, 6 Drawing Sheets

APPARATUS AND METHOD FOR DISPLAYING TRAFFIC INFORMATION USING WIDGETS IN MOBILE TERMINAL

PRIORITY

This application claims the benefit under 35 U.S.C. §119(a) of a Korean patent application filed in the Korean Intellectual Property Office on Jul. 28, 2008 and assigned Serial No. 10-2008-0073470, the entire disclosure of which is hereby incorporated by reference.

BACKGROUND OF THE INVENTION

1. Field of the Invention

The present invention relates to a mobile terminal. More particularly, the present invention relates to an apparatus and method for displaying traffic information on a standby screen without map information using widgets in a mobile terminal.

2. Description of the Related Art

A mobile terminal that can receive digital broadcasting can receive a digital broadcasting service using video, audio, and information data transmitted through a digital broadcasting network almost regardless of location. Here, the information data are additional information including an Electronic Program Guide (EPG), an Electronic Service Guide (ESG), and Transport Protocol Expert Group (TPEG) data. The TPEG data is used throughout digital broadcasting networks, such as Digital Audio Broadcasting (DAB), Digital Video Broadcasting-Terrestrial (DVB-T), Digital Video Broadcasting-Handheld (DVB-H), mediaFLO (forward link only), and Digital Multimedia Broadcasting (DMB). A mobile terminal, using a TPEG service receives traffic information through a digital broadcasting network, matches the received traffic information to map information, and provides the matched traffic information to a user. Accordingly, the mobile terminal should store a large amount of map information. Further, the user can use TPEG data only by driving a map information application of the mobile terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for synchronizing use information between mobile communication terminals comprising short-range wireless communication units.

Another aspect of the present invention is to provide an apparatus and method for displaying traffic information using widgets in a mobile terminal that can provide TPEG data received through a digital broadcasting network channel on a standby screen using widgets without driving a map information application.

In accordance with an aspect of the present invention, a method of displaying traffic information in a mobile terminal is provided. The method includes receiving traffic information from at least one broadcasting station through an at least one digital broadcasting channel, and displaying the traffic information on a standby screen with at least one of an image file and a text file using at least one widget.

In accordance with another aspect of the present invention, a mobile terminal for displaying traffic information is provided. The terminal includes a broadcasting reception unit for receiving traffic information from at least one broadcasting station through at least one digital broadcasting channel, and a controller for controlling to display the traffic information on a standby screen with at least one of an image file and a text file using at least one widget.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
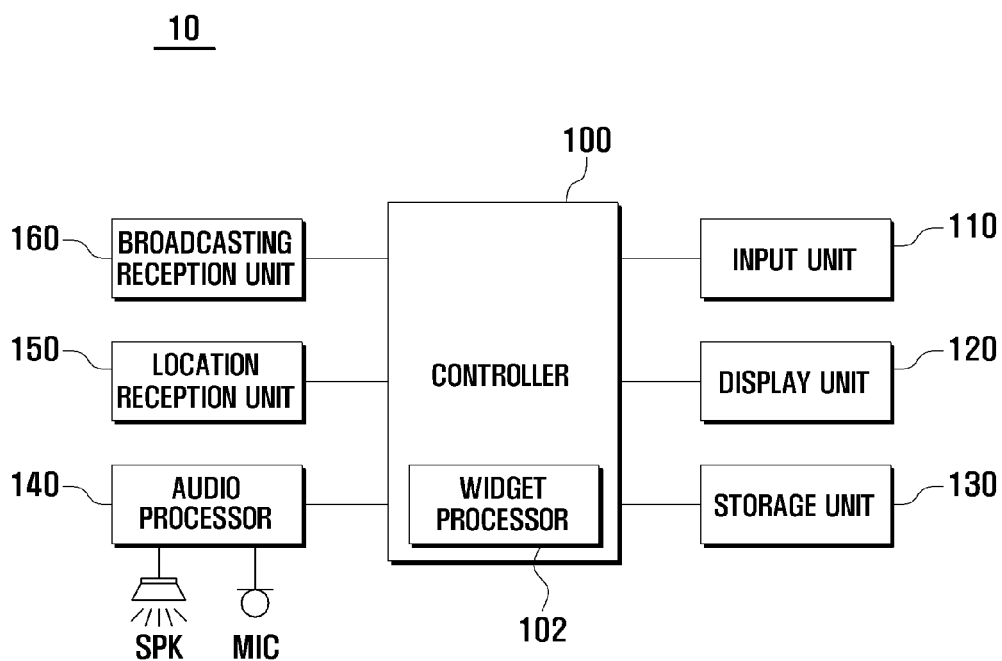
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions incorporated herein may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, 'traffic information' refers to one or more of Safe Driving Information (SDI), a Road Traffic Message (RTM), Summary Information Driving (SID), Point Of Interest (POI), news (NWS), Bus Service Information (BSI), parking Information (PKI), and the like. All of the above traffic information services use only TPEG data, whereas Congestion and Travel Time (CTT) is a TPEG service that also uses map information. Further, the traffic information is TPEG data received from a digital broadcasting network channel.

The 'TPEG service', other than the CTT service, refers to a service for providing TPEG data that can be used without map information extracted from TPEG data received from a broadcasting station through a digital broadcasting network channel.

A 'widget' refers to an application program for enabling a user to use functions provided in a Web browser without opening the Web browser. In exemplary embodiments of the present invention, TPEG data received from a broadcasting station are displayed using the widget on an auxiliary screen of a standby screen.

In exemplary embodiments of the present invention, the 'standby screen' represents a standby state of a mobile terminal. On the standby screen, a power state, electric wave reception intensity, date, time, and user information of the mobile terminal may be displayed. The 'auxiliary screen' is a separate screen displayed in a pop-up window on the standby screen. On the auxiliary screen, traffic information for a user is displayed.

A 'TPEG' standard is a standard prepared by cooperation between the International Organization for Standardization (ISO) and the European Committee for Standardization (CEN) for defining a method of transmitting traffic and travel information through various digital media and the Internet with the support of the European Broadcasting Union (EBU). The TPEG standards include standards for SID, SDI, RTM, POI, NWS, BSI, and PKI.

A mobile terminal according to an exemplary embodiment of the present invention is a terminal that can use the TPEG service and may be a mobile phone, a Personal Digital Assistant (PDA), a Code Division Multiple Access (CDMA) terminal, a Wideband Code Division Multiple Access (WCDMA) terminal, a Global System for Mobile Communication (GSM) terminal, an International Mobile Telecommunication 2000 (IMT-2000) terminal, a smart phone, a Universal Mobile Telecommunication System (UMTS) terminal, a laptop computer, and a personal computer, and applications thereof.

FIG. 1 is a block diagram illustrating a configuration of a mobile terminal according to an exemplary embodiment of the present invention.

Referring to FIG. 1, a mobile terminal 10 according to an exemplary embodiment of the present invention includes a controller 100, an input unit 110, a display unit 120, a storage unit 130, an audio processor 140, a location reception unit 150, and a broadcasting reception unit 160. The controller 100 includes a widget processor 102.

The broadcasting reception unit 160 receives a digital broadcasting signal transmitted from a broadcasting station at a preset interval through an antenna of the mobile terminal 10 and outputs the received digital broadcasting signal to the controller 100. The broadcasting reception unit 160 receives broadcast data from a digital broadcasting network, such as a DAB network, a DVB-T network, a DVB-H network, a MediaFLO network, and a DMB network, detects TPEG data, and outputs the TPEG data to the controller 100. The TPEG data transmitted from the broadcasting station include traffic information. Here, the traffic information included in the TPEG data includes SID, SDI, RTM, POI, NWS, BSI, PKI, and the like. In an exemplary embodiment of the present invention, the DMB network is an example of a digital broadcasting network to be used in the TPEG service.

The location reception unit 150 receives a Global Positioning System (GPS) signal from at least one GPS satellite, acquires present location information including a latitude coordinate and a longitude coordinate of the mobile terminal 10, and outputs the present location information to the controller 100, under the control of the controller 100. However, when using only a GPS signal transmitted from a GPS satellite, an error may occur, and thus the location reception unit 150 uses round trip delay information and pilot phase file information transmitted from a mobile communication base station together with the GPS signal in order to determine accurate location information. In general, in a CDMA network, a cell tracking method of determining a user location using a location of a present repeater connected to the user is used for determining the user location. Accordingly, the location reception unit 150 determines present location information of the mobile terminal 10 using trigonometry for determining a location of the mobile terminal 10 by receiving the location information, or for determining an accurate location by receiving location information from base stations of three or more locations.

The audio processor 140 converts a digital audio signal received from the controller 100 to an analog audio signal and reproduces the analog audio signal through a speaker (SPK) under the control of the controller 100, and converts an audio signal input through a microphone (MIC) into a digital audio signal and outputs the digital audio signal to the controller 100. More particularly, the audio processor 140 outputs the TPEG data with sound through the speaker (SPK) under the control of the controller 100.

The storage unit 130 stores an application program necessary for performing a function according to an exemplary embodiment of the present invention. The storage unit 130 includes a program area and a data area. In the program area, an operating system for booting the mobile terminal 10 and a program for parsing TPEG data are stored. Further, in the program area, a widget engine for representing TPEG data on an auxiliary screen using widgets is stored. The data area is an area for storing data generated when using the mobile terminal 10, and in the data area, the TPEG data are stored in an image file or a text file. The storage unit 130 stores recent traffic information acquired from TPEG data received through the broadcasting reception unit 160 by the control of the controller 100.

The display unit 120 displays operating states, operation results, and information processed in the mobile terminal 10 under the control of the controller 100. The display unit 120 may be configured with a display screen, such as a Liquid Crystal Display (LCD) display, an Organic Light Emitting Diode (OLED) display, and the like. In this case, the display unit 120 may include a controller for controlling the display screen, a video memory in which image data is stored and a display element. If the display screen is provided as a touch screen, the display unit 120 may perform a part or all of the functions of the input unit 110. The display unit 120 displays TPEG data on an auxiliary screen of a standby screen under the control of the controller 100.

The input unit 110 may be configured with a conventional keypad, which may be a touch screen, a touch pad, or a scroll wheel, etc. In order to control operations of the mobile terminal 10, the input unit 110 outputs a signal corresponding to a key input by a user to the controller 100. More particularly, the input unit 110 receives a signal requesting the display of traffic information input by a user and outputs the signal to the controller 100.

The controller 100 controls signal flows for overall operations and internal elements of the mobile terminal 10. More particularly, the controller 100 controls the broadcasting reception unit 160 to receive TPEG data from a broadcasting station. For example, the controller 100 controls the broadcasting reception unit 160 to receive TPEG data at an interval of 5 minutes from the broadcasting station. The TPEG data are data of a specific format and include traffic information. The controller 100 converts the received TPEG data into an image file or a text file and stores the converted file in the storage unit 130.

The controller 100 controls the location reception unit 150 to receive present location information of the mobile terminal 10. Further, the controller 100 extracts traffic information matched to location information of the received TPEG data. The traffic information matched to location information includes SDI, such as a damaged road location that is disrupting traffic flow, a frozen road segment location representing a road region impaired by ice or snow, a tunnel location for notifying of a tunnel positioned ahead, and a speed camera location for preventing overspeeding, or an RTM such as a traffic accident location causing a traffic jam, a location for a gathering, and a road construction location.

If traffic information matched to the present location information is extracted, the controller 100 controls the widget processor 102 to display the traffic information using widgets on an auxiliary screen of the standby screen. Here, the controller 100 enlarges or reduces a size of the auxiliary screen and moves a location of the auxiliary screen by movement of a direction key by a user. Further, the controller 100 controls to display the auxiliary screen at a preset location on the standby screen, or to move an already displayed auxiliary screen to another location. The controller 100 also controls to display the extracted SDI with a single line on the auxiliary screen of the standby screen using a slide display method as requested by a user.

Further, the controller 100 controls the audio processor 140 to output SDI matched to location information of TPEG data with sound.

If a signal for displaying other traffic information on the auxiliary screen of the standby screen is input by a user, the controller 100 controls the widget processor 102 to display the other traffic information in the display unit 120. The other traffic information is traffic information other than that already processed among TPEG data received through the broadcasting reception unit 160.

The widget processor 102 has a function of executing widgets, each of which is an application program of the mobile terminal 10. The widget processor 102 displays traffic information included in TPEG data received from a broadcasting station through the broadcasting reception unit 160 on the auxiliary screen of the standby screen.

Figure 2:
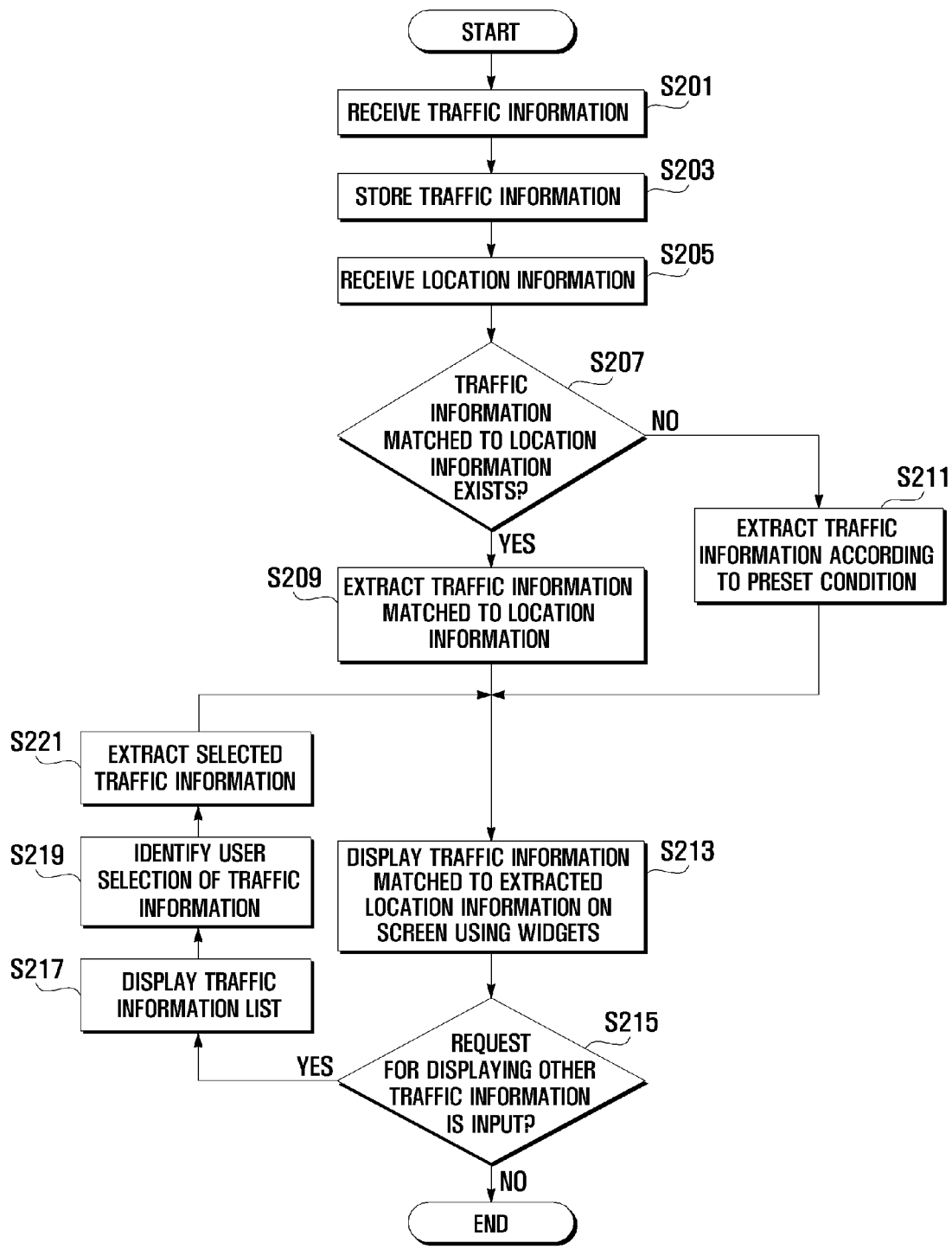
FIG. 2 is a flowchart illustrating a method of providing traffic information on a screen using widgets according to an exemplary embodiment of the present invention.

FIG. 2 is a flowchart illustrating a method of providing traffic information on a screen using widgets according to an exemplary embodiment of the present invention.

Figure 3A:
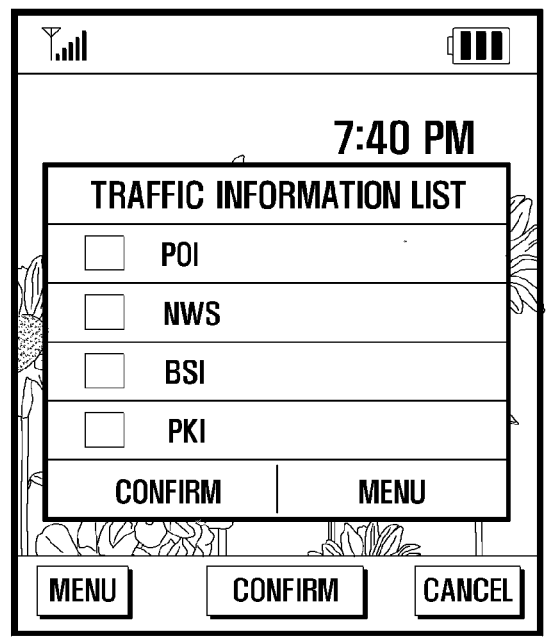
FIGS. 3A to 3C illustrate displays of traffic information on a screen according to an exemplary embodiment of the present invention.
Figure 3B:
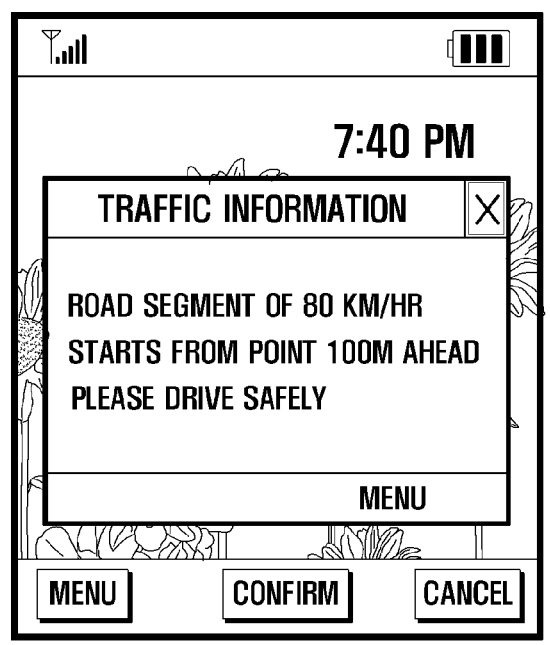
Figure 3C:
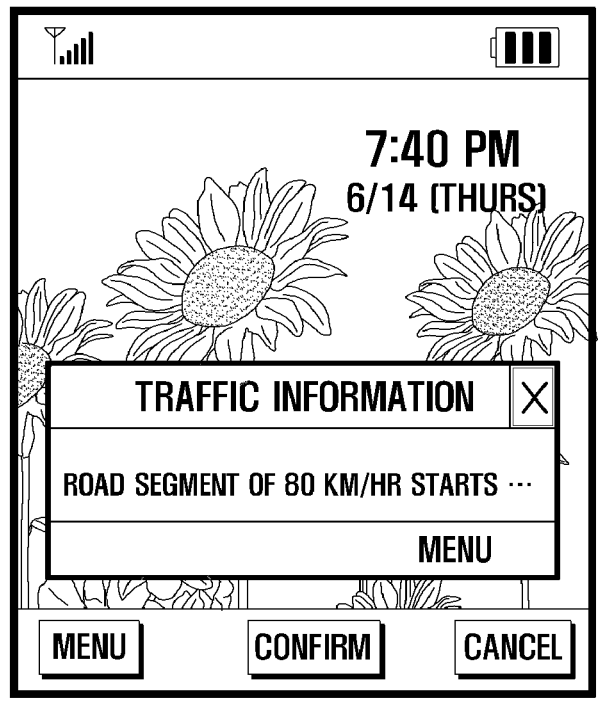

FIGS. 3A to 3C illustrate displays of traffic information on a screen according to an exemplary embodiment of the present invention.

Figure 4A:
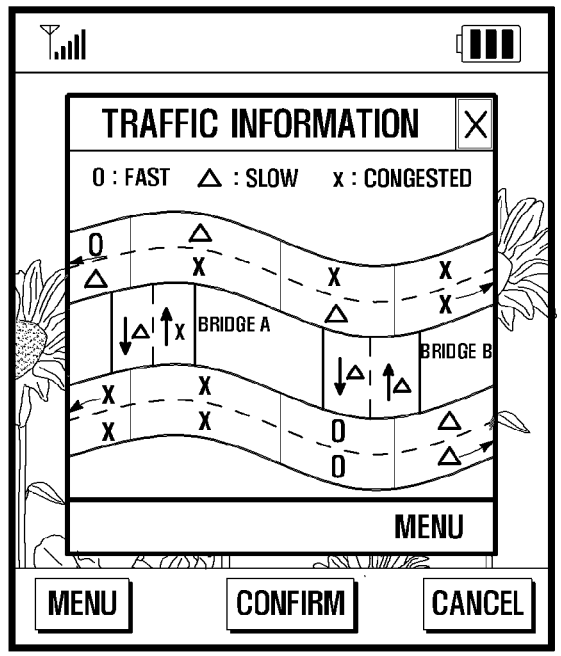
FIGS. 4A and 4B illustrate displays of an adjusted size of an auxiliary screen according to an exemplary embodiment of the present invention.
Figure 4B:
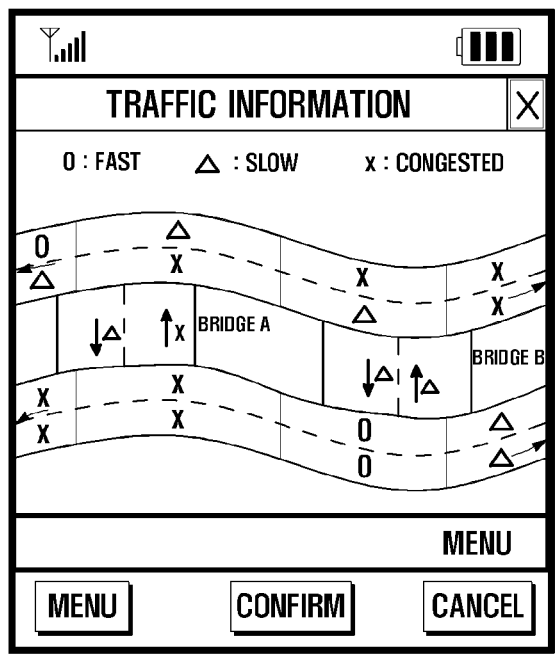

FIGS. 4A and 4B displays of an adjusted size of an auxiliary screen according to an exemplary embodiment of the present invention.

Figure 5A:
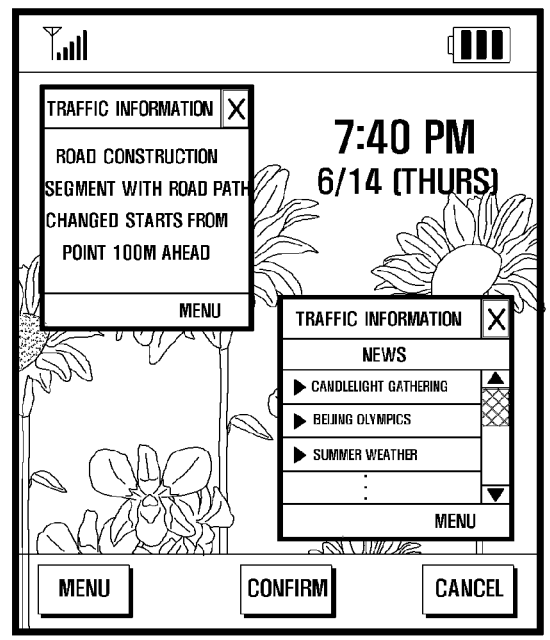
FIGS. 5A and 5B illustrate displays of a plurality of traffic information on a standby screen according to an exemplary embodiment of the present invention.
Figure 5B:
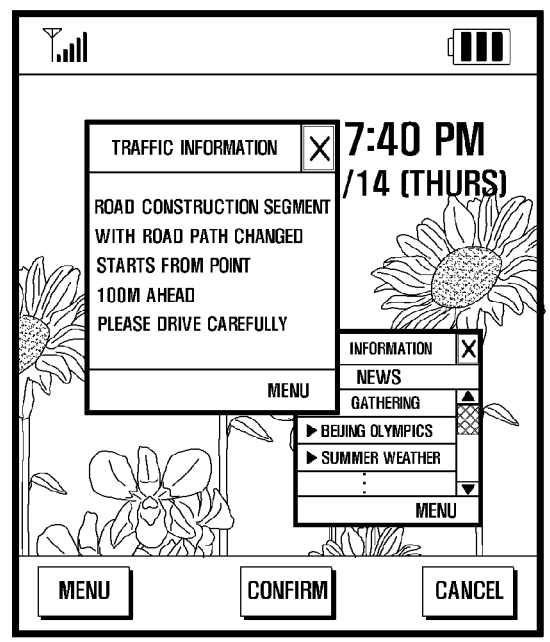

FIGS. 5A and 5B illustrate displays of a plurality of traffic information on a standby screen according to an exemplary embodiment of the present invention.

Referring to FIG. 2 to FIG. 5B, the controller 100 controls the broadcasting reception unit 160 to receive TPEG data including traffic information transmitted from a broadcasting station in step S201.

The controller 100 stores the received TPEG data in the storage unit 130 in step S203. Here, the controller 100 converts the received TPEG data into an image file or a text file and stores the converted file in the storage unit 130.

The controller 100 controls the location reception unit 150 to receive present location information in step S205.

When the location information is received, the controller 100 determines whether traffic information matched to the received location information exists in the storage unit 130 in step S207.

If traffic information matched to the received location information exists in the storage unit 130, the controller 100 extracts the traffic information matched to the location information in step S209. For example, the controller 100 extracts SDI of TPEG data stored in the storage unit 130, which includes speed camera location information represented with a latitude coordinate and a longitude coordinate. Here, the controller 100 compares a present location coordinate of the mobile terminal 10 and a speed camera coordinate received through the location reception unit 150 to determine a distance between the compared coordinate values. If the distance between the compared coordinate values is a value within the preset distance, the controller 100 extracts SDI existing within the preset distance. In this case, the controller 100 divides the total distance into sections of a preset length, for example 10 m divisions, 100 m divisions, or 1 km divisions.

Further, the controller 100 extracts an RTM stored in the storage unit 130, which includes location information of a traffic accident location represented with a latitude coordinate and a longitude coordinate. The controller 100 compares a coordinate of the present location information received through the location reception unit 150 and a coordinate of a traffic accident location. If the distance between the compared coordinate values is a value within a preset distance, the controller 100 extracts an RTM existing within the preset distance. In this case, the controller 100 divides the total distance into sections of a preset length, for example 10 m divisions, 100 m divisions, or 1 km divisions.

In contrast, if traffic information matched to the received location information does not exist in the storage unit 130 at step S207, the controller 100 extracts traffic information according to a preset condition in step S211. Here, the preset condition indicates a priority order of traffic information set by a user. For example, referring to FIG. 3A, the controller 100 controls the location reception unit 150 to receive traffic information frequently used by the user from the SID, SDI, RTM, POI, NWS, BSI, and PKI of the received TPEG data list. In this case, if the POI is traffic information of the highest priority order, the controller 100 preferentially processes the POI regardless of a preset location. For example, the POI may include a location of a frequently used gas station, restaurant, and shopping center input by the user.

The widget processor 102 displays traffic information matched to the extracted location information or traffic information according to a preset condition using widgets on the auxiliary screen of the standby screen in step S213. In this case, the controller 100 controls to display traffic information without map information in an image file or a text file on the auxiliary screen. That is, the controller 100 controls to display TPEG data other than CTT, which is TPEG data requiring map information. For example, referring to FIG. 3B, the controller 100 controls the display unit 120 to display SDI matched to location information on the auxiliary screen. In this case, the controller 100 controls to compare a latitude coordinate and a longitude coordinate of an event or a region included in the SDI and a coordinate of location information of the mobile terminal and to display the extracted SDI on the auxiliary screen. Further, the controller 100 may adjust a size of the auxiliary screen based on user input.

Referring to FIG. 3C, the controller 100 may also control to display the extracted SDI with a single line on the auxiliary screen of the standby screen using a slide display method, according to user selection. When traffic information of the SDI cannot be fully displayed with a single line on the auxiliary screen, the controller 100 controls to notify that a sentence is not yet finished by displaying a symbol '...'. Further, the controller 100 controls to repeatedly display the sentence on the auxiliary screen using a slide display method. When a user request for a change of the sentence displayed on the auxiliary screen is input, the controller 100 controls to display the changed sentence on the auxiliary screen.

Referring to FIG. 4A, the controller 100 controls the display unit 120 to display an RTM on the auxiliary screen. The controller 100 controls the display unit 120 to display the RTM of the received TPEG data in an image file. In an exemplary implementation as illustrated in FIG. 4A, the controller 100 controls to divide a traffic situation of major roads and large bridges along a section of a large river into fast, slow, and congested and to display traffic information of an image file on the auxiliary screen. In an exemplary embodiment of the present invention, image files of traffic information representing traffic flows are represented with symbols (square, triangle, and circle), however the image files are not limited to these symbols and may be represented with other symbols or colors.

Further, the controller 100 can control to change traffic information displayed on the auxiliary screen using widgets to a size of a full screen by user input. For example, referring to FIG. 4B, the controller 100 controls to display an RTM displayed on an auxiliary screen of the standby screen at a size of the full screen. That is, the controller 100 controls to adjust the auxiliary screen to a size of the full screen. After the auxiliary screen is adjusted to the full screen, when a preset time period has elapsed, the controller 100 controls to resize an auxiliary screen representing an RTM displayed on the full screen to a small size and to display the resized auxiliary screen on the standby screen. Further, the controller 100 may control to enlarge or reduce a size of the auxiliary screen representing the traffic information, or to move a location of the auxiliary screen displayed on the standby screen according to input by the user using a direction key.

The controller 100 determines whether an input signal for displaying other traffic information on the auxiliary screen using widgets is input by the user in step S215.

If an input signal for displaying another traffic information on the auxiliary screen using widgets is input by the user, the controller 100 controls the display unit 120 to display a traffic information list of the received TPEG data in step S217. The controller 100 controls the display unit 120 to display a traffic information list of SID, SDI, RTM, POI, NWS, BSI, and PKI, which are received as TPEG data.

The controller 100 identifies an input signal of traffic information selected by the user from the displayed traffic information list in step S219. For example, the controller 100 determines that PKI is selected from the traffic information list through the input unit 110.

When a traffic information category is selected, the controller 100 extracts the selected traffic information in step S221. In an exemplary implementation, the controller 100 extracts traffic information of PKI. In this case, the controller 100 may extract a plurality of traffic information requested by the user. That is, the controller 100 may extract further traffic information in addition to the PKI.

The process then returns to step S213, where the widget processor 102 displays the extracted traffic information on the auxiliary screen using widgets. That is, the widget processor 102 controls the display unit 120 to display the extracted traffic information on the auxiliary screen such that the user may view the extracted traffic information. The widget processor 102 can control the display unit 120 to display multiple traffic information on the auxiliary screen. For example, referring to FIG. 5A, the widget processor 102 controls the display unit 120 to display a plurality of traffic information on the auxiliary screen. The controller 100 controls the display unit 120 to display SDI and NWS using two auxiliary screens on the standby screen. Here, the controller 100 controls the display unit 120 such that the two auxiliary screens are not overlapped on the standby screen. However, when the display unit 120 displays a large amount of traffic information, it may not be possible for the controller 100 to control the display unit 120 to display all of the auxiliary screens including requested traffic information on the standby screen without overlaying of at least one of the auxiliary screens. In this case, the controller 100 controls the display unit 120 to display an indication indicating that an undisplayed auxiliary screen exists on the standby screen by installing a scroll bar at a side of the screen, or by installing an arrow at a lower end portion of the standby screen.

Referring to FIG. 5B, the controller 100 controls to adjust sizes of auxiliary screens displayed on the standby screen. For example, the controller 100 controls the display unit 120 to enlarge an auxiliary screen representing SDI and to reduce an auxiliary screen representing NWS on the standby screen. Alternatively, the controller 100 may control the display unit 120 to enlarge an auxiliary screen representing NWS and to reduce an auxiliary screen representing SDI on the standby screen.

If an input signal for displaying other traffic information on the auxiliary screen using widgets is not input by the user at step S215, the controller 100 controls to continuously display traffic information provided on the auxiliary screen of the standby screen. Further, when new traffic information is received through the broadcasting reception unit 160, the controller 100 controls to display the new traffic information. Further, when a preset time period has elapsed, the controller 100 may control the display unit 120 to discontinue the display of traffic information provided on the auxiliary screen.

As described above, according to exemplary embodiments of the present invention, a user can determine a traffic situation using traffic information provided on a standby screen using widgets.

Further, even when no navigation device is provided in a mobile terminal, the user can conveniently receive traffic information.

While the invention has been shown and described with reference to certain exemplary embodiments, it will be understood by those skilled in the art that various changes in form and details may be made therein without departing from the spirit and scope of the invention as defined by the appended claims and their equivalents.

What is claimed is:
1. A method of displaying traffic information in a mobile terminal, the method comprising:
  receiving traffic information from at least one broadcasting station through at least one digital broadcasting channel;
  receiving information of a location of the mobile terminal, determining traffic information matched to the location information from the received traffic information by determining whether a distance between coordinates corresponding to a present location of the mobile terminal and coordinates corresponding to each respective received traffic information is within a predefined threshold, extracting the traffic information matched to the location information from the received traffic information, displaying the extracted traffic information matched to the location information on a standby screen with at least one of an image file and a text file using at least one widget without actively running a map information application.

2. The method of claim 1, wherein the at least one widget displays the traffic information using an auxiliary screen on the standby screen.

3. The method of claim 1, wherein the extracted traffic information comprises safe driving information representing at least one of a damaged road location, a frozen road segment location, a tunnel location, and a speed camera location.

4. The method of claim 1, wherein the extracted traffic information comprises a road traffic message representing at least one of a traffic accident location, a location of a gathering, and a road construction location.

5. The method of claim 1, wherein the displaying of the traffic information comprises:

enlarging and reducing a size of the auxiliary screen; and moving a location of the auxiliary screen based on actuation of a direction key by a user.

6. A mobile terminal for displaying traffic information, the terminal comprising:

a broadcasting reception unit for receiving traffic information from at least one broadcasting station through at least one digital broadcasting channel;

a location reception unit for receiving information of a location of the mobile terminal; and a controller for controlling to determine traffic information matched to the location information from the received traffic information by determining whether a distance between coordinates corresponding to a present location of the mobile terminal and coordinates corresponding to each respective received traffic information is within a predefined threshold, for controlling to extract traffic information matched to the location information from the received traffic information, and for controlling to display the extracted traffic information matched to the location information on a standby screen with at least one of an image file and a text file using at least one widget without actively running a map information application.

7. The terminal of claim 6, wherein the at least one widget displays the traffic information using an auxiliary screen on the standby screen.

8. The terminal of claim 6, wherein the extracted traffic information comprises safe driving information representing at least one of a damaged road location, a frozen road segment location, a tunnel location, and a speed camera location.

9. The terminal of claim 6, wherein the extracted traffic information comprises a road traffic message representing at least one of a traffic accident location, a location of a gathering, and a road construction location.

10. The terminal of claim 6, wherein the controller comprises a widget processor for displaying the traffic information included in Transport Protocol Expert Group (TPEG) data received from at least one broadcasting station through the broadcasting reception unit on an auxiliary screen of the standby screen.

11. The terminal of claim 10, wherein the widget processor enlarges and reduces a size of the auxiliary screen, and moves a location of the auxiliary screen based on actuation of a direction key by a user.

12. The method of claim 1, wherein the traffic information matched to the location information is extracted without running a map information application.

13. The method of claim 12, wherein the extracted traffic information is extracted as at least one of an image file and a text file.

14. The method of claim 1, wherein the displaying of the traffic information includes discontinuing displaying any traffic information which has been displayed for a predefined time period.

15. The terminal of claim 6, wherein the controller controls to extract the traffic information matched to the location information without running the map information application.

* * * * *